US012800539B2

(12) United States Patent
Johnson, Jr. et al.

(10) Patent No.: US 12,800,539 B2
(45) **Date of Patent: *Nov. 17, 2026**

(54) PH SENSING TECHNIQUE BASED ON GRAPHENE ELECTRODES

(71) Applicant: The Trustees of the University of Pennsylvania, Philadelphia, PA (US)

(72) Inventors: Alan T. Johnson, Jr., Philadelphia, PA (US); Jinglei Ping, Gaithersburg, MD (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 130 days.

This patent is subject to a terminal disclaimer.

(21) Appl. No.: 18/907,696

(22) Filed: Oct. 7, 2024

(65) Prior Publication Data

US 2025/0027900 A1 Jan. 23, 2025

Related U.S. Application Data

(63) Continuation of application No. 17/711,134, filed on Apr. 1, 2022, now Pat. No. 12,392,747, which is a continuation of application No. 16/085,014, filed as application No. PCT/US2017/022103 on Mar. 13, 2017, now Pat. No. 11,327,041.

(60) Provisional application No. 62/308,069, filed on Mar. 14, 2016.

(51) Int. Cl.

| | |
|---|---|
| ***G01N 27/30*** | (2006.01) |
| ***G01N 27/416*** | (2006.01) |
| *G01N 27/36* | (2006.01) |

(52) U.S. Cl.

CPC ......... *G01N 27/308* (2013.01); *G01N 27/302* (2013.01); *G01N 27/4167* (2013.01); *G01N 27/36* (2013.01)

(58) Field of Classification Search

CPC ....... G01N 2030/067; G01N 2030/143; G01N 2030/884; G01N 2030/8886; G01N 30/06; G01N 30/88; G01N 33/03; G01N 27/302; G01N 27/308; G01N 27/36; G01N 27/4167

See application file for complete search history.

(56) References Cited

U.S. PATENT DOCUMENTS

| | | | |
|---|---|---|---|
| 4,889,612 | A | 12/1989 | Geist et al. |
| 5,672,257 | A | 9/1997 | Birch et al. |
| 11,327,041 | B2 | 5/2022 | Johnson, Jr. et al. |
| 2009/0278556 | A1 | 11/2009 | Man et al. |
| 2012/0088258 | A1 | 4/2012 | Bishop et al. |
| 2014/0145709 | A1 | 5/2014 | O'Riordan et al. |
| 2016/0025678 | A1 | 1/2016 | Kurup et al. |
| 2016/0033438 | A1 | 2/2016 | Lan et al. |
| 2017/0261460 | A1 | 9/2017 | Ogihara et al. |
| 2019/0086388 | A1 | 3/2019 | Yu et al. |

FOREIGN PATENT DOCUMENTS

| | | |
|---|---|---|
| CN | 104897755 A | 9/2015 |

OTHER PUBLICATIONS

Balandin et al., "Superior Thermal Conductivity of Single-Layer Graphene", Nanoletters, 2008, vol. 8, No. 03, pp. 902-907.

Kuzum et al. Transparent and Flexible Low Noise Graphene Electrodes for Simultaneous Electrophysiology and Neuroimaging, Nature Communications, 2014, vol. 5:5259, 10 pages.

*Primary Examiner* — Gurpreet Kaur
(74) *Attorney, Agent, or Firm* — BakerHostetler

(57) ABSTRACT

Provided are devices and methods for a rapid, non-perturbative and energy-efficient technique for pH sensing based on a flexible graphene electrode. This technique does not require the application of gate voltage or source-drain bias, and demonstrates fast pH-characterization with precision. The disclosed technology is suitable for in vivo monitoring of tumor-induced pH variation in tissues and detection of pH changes as required in a DNA sequencing system.

9 Claims, 5 Drawing Sheets

PH SENSING TECHNIQUE BASED ON GRAPHENE ELECTRODES

RELATED APPLICATIONS

The present application is a continuation of U.S. patent application Ser. No. 17/711,134, “pH Sensing Technique Based On Graphene Electrodes” (filed Apr. 1, 2022); which is a continuation of U.S. patent application Ser. No. 16/085,014, “pH Sensing Technique Based On Graphene Electrodes” (filed Sep. 14, 2018 and issued as U.S. Pat. No. 11,327,041 on May 10, 2022); which is the National Stage Application of International Patent Application No. PCT/US2017/022103, “pH Sensing Technique Based On Graphene Electrodes” (filed Mar. 13, 2017); which claims priority to and the benefit of U.S. patent application No. 62/308,069, “pH Sensing Technique Based On Graphene Electrodes” (filed Mar. 14, 2016). All foregoing applications are incorporated herein by reference in their entireties for any and all purposes.

GOVERNMENT RIGHTS

This invention was made with government support under W911NF1010093 awarded by the Defense Advanced Research Projects Agency and the United States Army Research Office. The government has certain rights in the invention.

TECHNICAL FIELD

The present disclosure relates to the field of pH measurement and to the field of graphene devices.

BACKGROUND

Accurate and in vivo measurement of pH is vital for medical diagnosis, treatment, and health care. Tumors, for instance, tends to be more acidic (0.5~1.2 pH unit) than normal tissues. pH sensors based on conventional materials such as glass and silicon suffer from large size, slow response, mechanical fragility, size-limitation, etc. Accordingly, there is a need in the art for improved pH measurement methods and improved pH measurement devices.

SUMMARY

Provided herein are graphene based pH sensors that do not require the application of gate voltage or source-drain bias, and demonstrate fast pH measurement so as to be suitable for in-vivo monitoring. These disclosed devices avoid the hazards presented by traditional glass-based pH meters, and also have a flexible and scalable design. New aspects of this design include low level signal measure, high sensitivity, being a non-FET device, being, less prone to artifacts, and having no current flow to confound measurements.

Disclosed here is, inter alia, a technique for measuring low-level Faradaic charge-transfer current (fA) across the graphene/solution interface via real-time charge monitoring of graphene microelectrodes in ionic solution. This technique enables the development of flexible and transparent pH sensors that are useful in, inter alia, in vivo applications.

The presented pH-sensing technique, based on graphene electrodes, overcomes the shortcomings of pH sensors based on GFETs, without also compromising performance. Examples of the graphene electrodes are gated through the electrostatic potential of the ionizable groups that adsorb on graphene. The measurement does require application of a gate-voltage or source-drain bias, so the device minimally perturbs the system under investigation and also consumes minimal power during its own operation. As one example, for an ionic solution with pH around 7, it only takes about 5 seconds (or less) to achieve a precision of 0.1 pH units, far more precise than what may be needed to distinguish the pH variation induced by a tumor, for example.

In one aspect, the present disclosure provides sensor devices, comprising: a substrate layer; the substrate being at least partially surmounted by a conductive contact; a graphene electrode in electronic communication with the conductive contact; and an amount of passivation material disposed atop the graphene electrode, the amount of passivation material having a window formed therein so as to expose a sensing portion of the graphene electrode to the environment exterior to the sensor device.

Also provided are methods of measuring an electronic characteristic of a sample, comprising: contacting the sample to the sensing portion of the graphene electrode of a device according to the present disclosure; measuring a Faradaic current associated with contact between the sample and the sensing portion of the graphene electrode; and estimating an electronic characteristic of the sample based on the measured Faradaic current.

Also disclosed are methods, the methods comprising estimating the pH of a sample from a Faradaic current associated with contacting the sample and a graphene electrode.

Additionally provided are methods of fabricating a device, comprising: disposing an amount of graphene on a substrate, the disposing being performed so as to place the graphene into electronic communication with a conductive contact; disposing an insulating material atop the graphene; and defining a window in the insulating material so as to expose at least a portion of the graphene.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
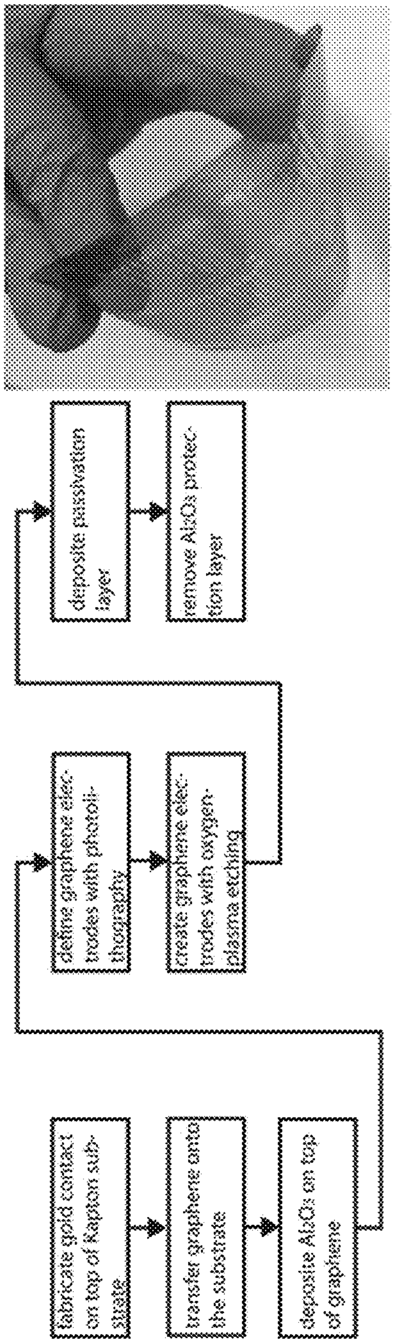
FIG. 1 provides an exemplary workflow of the device-fabrication process and the as-fabricated flexible devices.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it can be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

Provided here are, inter alia, devices and methods for effecting a rapid, non-perturbative and energy-efficient technique for pH sensing based on a flexible graphene electrode. This technique does not require the application of gate voltage or source-drain bias, and demonstrates fast pH-characterization with precision that would be suitable for in vivo monitoring of tumor-induced pH variation in tissues and detection of pH changes as required in a DNA sequencing system. The technology may be applied to testing of biological samples (e.g., in vitro, in vivo), as the technology may be made in flexible and bio-compatible devices.

Applications of the disclosed technology include fast and ultra-low-power pH sensing through small-volume samples (~$10^2$ μL) if large-scale sample-preparation is not feasible. Real-time in vivo monitoring of the pH of tissues may be performed, while at the same time avoiding the hazards that may be caused by traditional glass-based pH meters. Real-time detecting of pH changes as part of a system for DNA sequencing may also be performed.

Existing technologies have been under development for some time but successful commercialization remains a challenge. Further, a major complication in existing technologies is encapsulation of sensitive parts of the device that cannot survive contact with bodily fluids. This issue is essentially eliminated for graphene devices, as such devices are bio-compatible.

The present technology presents a number of advantages. First, the disclosed graphene electrodes are flexible, safe, provide comparatively fast readout (seconds), minimally perturbative, ultra-low power, and have a signal that is reversible. Compared to conventional glass-based pH meters, a graphene electrode may be relatively small, and can be fabricated on a polymer substrate that is compatible with body tissue and also free of the hazards presented by broken glass. Further, compared with graphene FETs, the graphene electrode characterizes the pH through direct charge measurement, without the need for a swept gate voltage or source-drain bias. This in turn makes the disclosed devices faster, intrinsically more energy efficient, and minimally perturbative to the system under measurement. The disclosed graphene electrodes also demonstrated better reversibility than graphene FETs.

EXEMPLARY EMBODIMENTS

Gold contacts were pre-fabricated on a piece of flexible Kapton polyimide substrate. An inch-size graphene sheet synthesized via ambient pressure chemical vapor deposition on copper was transferred to the substrate and fabricated into electrodes using photolithography and oxygen plasma etching. A 7 micrometer thick SU-8 (2007, Microchem) bio-compatible passivation layer was created to cover the gold electrode with a 100 μm×100 μm window through which the graphene electrode is exposed.

An electrometer was used to measure charge transfer between the graphene electrode and ~$10^2$ μL 150 mM NaCl aqueous solutions with various pH values. The Faradic current extracted from five-second of charge-transferring measurement decreases monotonically with respect to the pH values, and thus may be used to characterize the pH instantly. The reversibility of the graphene electrode was also confirmed.

Graphene Sheet Preparation

Copper foil (99.8% purity) was loaded into a four-inch quartz tube furnace and annealed for 30 minutes at 1050° C. in an ultra-high-purity hydrogen atmosphere (99.999%) with a flow rate of 80 sccm and a pressure of 850 mT at the tube outlet in order to remove oxide residues. Methane as a chemical vapor deposition (CVD) precursor was passed in with a flow rate 45 sccm, and graphene was then deposited for 60 min.

Device Fabrication:

The graphene on copper growth substrate was coated with a 500 nm layer of poly(methyl methacrylate) (PMMA, Microchem). The PMMA/graphene/copper trilayer was then immersed in a 0.1M NaOH solution and connected to the cathode of a power supply. With application of DC current of ~1 A, the PMMA/graphene bilayer was peeled off from the copper substrate. After thoroughly rinsing with DI-water, the PMMA/graphene bilayer was transferred onto a Kapton film with 5 nm/40 nm Cr/Au contacts that were pre-fabricated through photolithography and thermal evaporation. After removal of PMMA with acetone, the film was annealed on an open-air hot plate at 200° C. for 1 hour.

A 5 nm $Al_2O_3$ sacrificial layer was deposited onto graphene with e-beam evaporation. Then, a 500 μm×500 μm graphene electrode was defined by photolithography with photoresist AZ 5214E (MICROCHEM). In the developing process, the $Al_2O_3$ sacrifice layer together with the photoresist, except at the region that covered the graphene electrode, were removed by the organic basic developer AZ 422 MIF (MICROCHEM). Graphene that was unprotected by the $Al_2O_3$/photoresist was then removed by oxygen plasma etching. A passivation layer of 7 μm thick photoresist SU-8 (MICROCHEM) was created via photolithography process with a 100 μm×100 μm window that exposed the graphene electrode. The photoresist and $Al_2O_3$ over the graphene electrode was then removed with photoresist remover 1165 (SHIPLEY) and subsequently AZ 422 MIF. At last the whole as-fabricated film was hard-baked at 200° C. on an open-air hotplate for 2 hours. The process and an as-fabricated device is shown in FIG. 1.

Device pH Characterization

Figure 2:
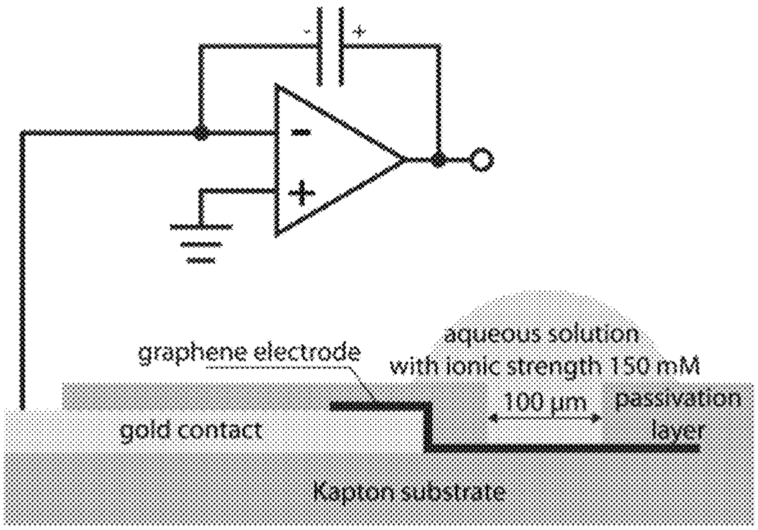
FIG. 2 provides an exemplary setup for characterizing the pH sensing properties of the graphene electrode with the electrometer.

An electrometer (Keithley 5217a) with comparatively low noise was used to measure the small scale Faradaic charge-transfer process (<pC/s) at the graphene/solution interface. The setup of the measurement is shown in FIG. 2. The noninverting input of the operational amplifier in the electrometer was initially grounded.

Aliquots of aqueous NaCl solution (~$10^2$ μL, with an ionic strength of 150 mM that is typical of bodily fluids in vivo) with various pH values were exposed to the graphene electrode through the 100 μm×100 μm window of the passivation layer. When the measurement commenced, the graphene electrode was connected to the inverting input of the operational amplifier. The charge that transferred from the solution to graphene and accumulated on the feedback capacitor was indicated as the readout of the electrometer.

Figure 3:
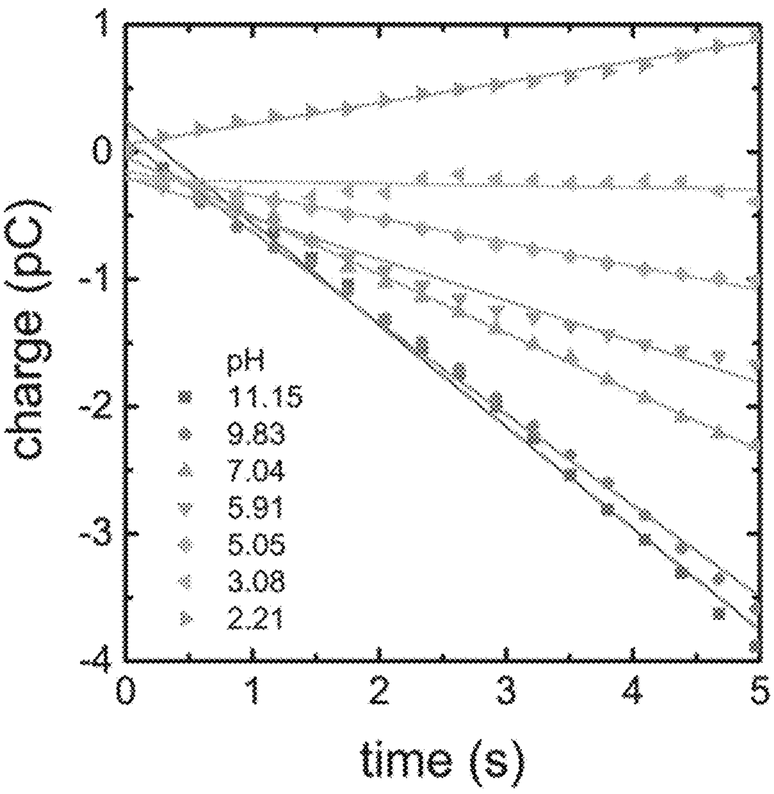
FIG. 3 provides real-time Faradaic charge transfer for various pH values measured by the electrometer (the solid lines are linear-fit)

The Faradaic charge transfer between the graphene and the ionic solutions changed linearly with time as shown in FIG. 3. The slope of the linear curve is taken as the Faradaic current i. At a comparatively high pH (near 11), electrons transfer from the solution to the graphene, inducing negative Faradaic current.

As the pH decreases, the Faradaic current becomes less negative, and the current becomes positive at pH of about 3.0. Compared to the swept-gate measurement process that typically takes several minutes for GFETs to determine the Dirac voltage, the Faradaic current was extracted within <5 seconds in this experiment. The resolution around pH=7 for this short period is significantly less than 0.5 pH units, making this technique especially suitable for in vivo fast monitoring of tumor-induced pH variation. In addition, the precision is proportional to the square root of the monitoring time, thus can be enhanced by extending the measurement period.

Figure 4:
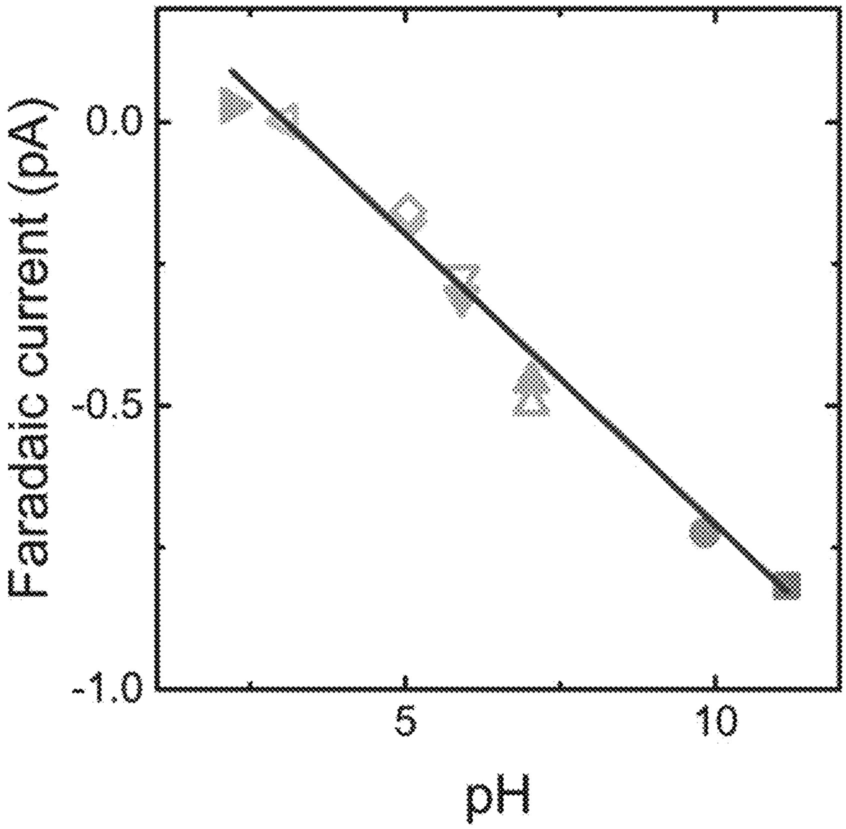
FIG. 4 provides an exemplary dependence of Faradaic current to pH value—hollow symbols represent the Faradaic current measured as the pH reversed.

The dependence of Faradaic current with pH shows an approximately linear relationship in the pH range of 2.2-11.2 (FIG. 4). The sensitivity is 0.12±0.01 pA/pH based on linear-fitting. For the data in FIG. 4, the pH was first decreased from 11 to 2, yielding the solid data points, then increased from 2 to 11, as shown with the open data points. The agreement between the measurements at each pH value tested shows that the measurement is reversible with negligible hysteresis. (The data markers in FIG. 4 correspond to the data markers in FIG. 3.)

Figure 5:
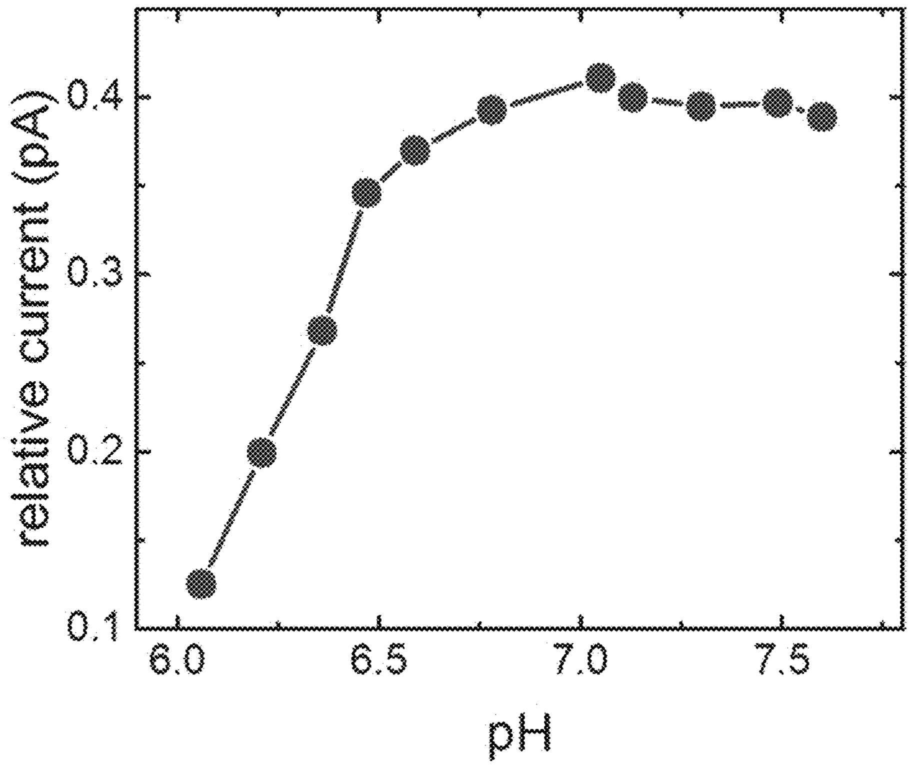
FIG. 5 provides a relative steady-state Faradaic current for serum as compared to the PBS baseline in the pH range 6.06-7.60.

A further exemplary embodiment of the disclosed technology is provided in FIG. 5, which figure illustrates exemplary testing of the pH response of flexible graphene electrode for human serum. For such testing, steady-state Faradaic current may be measured about 20 seconds after the graphene electrode is in contact with the serum. The relative Faradaic current (FIG. 5), computed by subtracting the PBS baseline (see FIG. 4 herein) from the current response to the human serum, shows a plateau in the range of pH from ~7.0 to 7.5, but decreases by about 0.3 pA as pH decreases from 7.0 to 6.0.

Without being bound to any particular theory or conditions, this pH-dependent response is larger than responses associated with physiological changes in ionic strength, and pH alleviation from 7.0 to 6.0 has been observed in the interstitial fluid of human non-metastatic tumor and metastatic tumor. Accordingly, the disclosed measurement methodology is suitable for detection of tumor- or otherwise-driven pH changes in vivo, e.g., by observing the pH of a sample of interest.

Comparison with Existing Technologies

The disclosed graphene-electrode devices are free of many disadvantages that have held back commercialization of conventional pH Sensors based on conventional materials (glass and silicon), such as slow response, mechanical fragility, and size-limitation. Thus it is more suitable to be used for in vivo applications such as tumor monitoring or monitoring of gastric pH, which is another important application. Moreover, unlike conventional pH meters that require large amount of liquid for functioning, the disclosed devices may obtain readings on only small sample volumes, e.g., $10^2$ μL-scale of sample.

The disclosed technology is also easier to design and fabricate than the pH-sensing techniques based on GFETs due to the fact that the electrode does not require a gate or bias voltage. For this reason, it is also ultra-low-power and non-perturbative to the system under measurement. The disclosed devices also demonstrate faster responsibility and better reversibility than conventional GFET-based devices.

One may also chemically and/or biologically functionalizing the graphene electrode. The charge-transfer properties of graphene/solution interface can be modified by the functionalization, which in turn allows adaptation of the graphene electrode to versatile applications in various conditions, ranges, and precisions for pH sensing. Further, the pH-sensing precision that was achieved with this graphene electrode (~0.5 pH unit) is within the range (~1.0 pH unit) of pH variation induced by DNA sequencing, so the disclosed methods technique can also be applied to DNA amplification and detection.

Exemplary Aspects

In one aspect, the present disclosure provides sensor devices, comprising: a substrate layer; the substrate being at least partially surmounted by a conductive contact; a graphene electrode in electronic communication with the conductive contact; and an amount of passivation material being disposed atop the graphene electrode, the amount of passivation material having a window formed therein so as to expose a sensing portion of the graphene electrode to the environment exterior to the sensor device.

The substrate layer comprises a polymer, most suitably an insulating polymer. Polyimide (e.g., Kapton™) is considered especially suitable. Other polymers may also be used. The substrate is also suitably flexible and also suitably biocompatible in nature. A substrate layer comprises a thickness in the range of from about 1 micrometer to about 1 cm, e.g., from about 1 micrometer, to about 500 micrometers, from about 5 micrometers to about 100 micrometers, or even from about 10 micrometers to about 50 micrometers.

The graphene electrode may be of single- or multi-layered graphene; single-layer graphene is suitable. A graphene electrode may comprise a cross-sectional dimension in the range of from 10 micrometers to 10,000 micrometers (e.g., from about 100 to about 1000 micrometers, from about 200 to about 900 micrometers, from about 300 to about 800 micrometers, from about 400 to about 700 micrometers, or even from about 500 to about 600 micrometers), though this is not a requirement. The graphene may be biologically or chemically functionalized.

The passivation material may be an electrical insulator, e.g., a ceramic, an oxide (e.g., metal oxide), and the like. Photoresist material is also suitable for use as a passivation material. The amount of passivation material may have a thickness in the range of from about 1 micrometer to about 1000 micrometers, e.g., from about 10 to about 900 micrometers, from about 50 to about 500 micrometers, or even from about 100 to about 300 micrometers.

Conductive contacts may be metal, e.g., gold, copper, silver, iron, and the like. The conductive contact may also be a non-metallic conductor (e.g., graphene, carbon nanotubes), or even a semiconductor.

The window formed in the passivation material may have a cross-sectional dimension (e.g., width, diameter, side length) in the range of from about 1 micrometer to about 10,000 micrometers, e.g., from about 10 to about 1000 micrometers, from about 100 to about 900 micrometers, from about 200 to about 800 micrometers, from about 300 to about 700 micrometers, from about 400 to about 600 micrometers, or even about 500 micrometers. The window may be round, square, rectangular, oblong, polygonal, or even irregular in shape. It should be understood that a device may include multiple graphene electrodes and multiple windows such that a device presents a plurality of exposed graphene electrodes. Each electrode of a given device may be individually addressable; in this way, a device may allow for analysis of multiple samples or multiple analyses of the same sample.

A device may include a processing train configured to measure Faradaic charge transfer of the graphene electrode. The processing train may include, e.g., an amplifier, an electrometer, and the like. One such train is shown in FIG. 2 and the related description of that FIG.

Also provided are methods of measuring an electronic characteristic of a sample, comprising: contacting the sample to the sensing portion of the graphene electrode of a device according to the present disclosure; measuring a Faradaic current associated with contact between the sample and the sensing portion of the graphene electrode; and estimating an electronic characteristic of the sample based on the measured Faradaic current. As described elsewhere herein, pH is one suitable electronic characteristic for these disclosed methods. The disclosure methods may further include correlating the electronic characteristic to a physiological state (e.g., a disease state, such as a cancerous state) of the subject from whom the sample was taken.

A sample being analyzed may have a volume of less than about 1000 microliters, less than about 500 microliters, or even less than about 200 microliters.

Additional methods are provided, these additional methods comprising estimating the pH of a sample from a Faradaic current associated with contacting the sample and a graphene electrode. The Faradaic current may be based on a change in Faradaic charge transfer over time. The disclosure methods may further include correlating the electronic characteristic to a physiological state (e.g., a disease state, such as a cancerous state) of the subject from whom the sample was taken.

A sample may have a volume of less than about 1000 microliters, less than about 500 microliters, or even less than about 200 microliters. The graphene electrode may be the graphene electrode of a device according to the present disclosure.

Further provided are methods of fabricating a device, comprising: disposing an amount of graphene on a substrate, the disposing being performed so as to place the graphene into electronic communication with a conductive contact; disposing an insulating material atop the graphene; and defining a window in the insulating material so as to expose at least a portion of the graphene. The methods may be performed so as to give rise to a device according to the present disclosure.

It should be understood that the disclosed devices may be utilized in an ex vivo fashion in which a user extracts a sample (fluid, tissue) from a subject and then contacts that sample to the device for further analysis. In some embodiments, a device may be inserted into a subject such that the device contacts a fluid or other tissue of interest within the subject.

What is claimed:

1. A sensor device, comprising:

a conductive contact;

a graphene electrode in electrical communication with the conductive contact, wherein the graphene electrode comprises functionalized graphene; and a processing train configured to measure Faradaic charge transfer between the graphene electrode and a sample in contact with the graphene electrode, the processing train determining an electronic characteristic of the sample from the Faradaic charge transfer between the graphene electrode and the sample.

2. A sensor device, comprising a conductive contact;

a graphene electrode in electrical communication with the conductive contact; and a processing train configured to measure Faradaic charge transfer between the graphene electrode and a sample in contact with the graphene electrode, the processing train determining an electronic characteristic of the sample from the Faradaic charge transfer between the graphene electrode and the sample, the sensor device further comprising an amount of passivation material superposed over the graphene electrode, the amount of passivation material having a window formed therein so as to expose a sensing portion of the graphene electrode, wherein the passivation material is an electrical insulator, and wherein the electrical insulator comprises at least one of a ceramic and an oxide.

3. A sensor device, comprising:

a conductive contact, wherein the conductive contact comprises a metal;

a graphene electrode in electrical communication with the conductive contact; and a processing train configured to measure Faradaic charge transfer between the graphene electrode and a sample in contact with the graphene electrode, the processing train determining an electronic characteristic of the sample from the Faradaic charge transfer between the graphene electrode and the sample.

4. The sensor device of claim 3, wherein the metal comprises at least one of gold, copper, silver, and iron.

5. A sensor device, comprising:

a conductive contact, wherein the conductive contact comprises a non-metallic conductor;

a graphene electrode in electrical communication with the conductive contact; and a processing train configured to measure Faradaic charge transfer between the graphene electrode and a sample in contact with the graphene electrode, the processing train determining an electronic characteristic of the sample from the Faradaic charge transfer between the graphene electrode and the sample.

6. A method of measuring an electronic characteristic of a sample, comprising:

contacting the sample to a graphene electrode in electrical communication with a conductive contact;

measuring a Faradaic current associated with contact between the sample and the graphene electrode; and estimating the electronic characteristic of the sample based on the measured Faradaic current, wherein the electronic characteristic is pH.

7. A method of measuring an electronic characteristic of a sample, comprising:

contacting the sample to a graphene electrode in electrical communication with a conductive contact;

measuring a Faradaic current associated with contact between the sample and the graphene electrode;

estimating the electronic characteristic of the sample based on the measured Faradaic current; and relating the electronic characteristic to a physiological state of a subject from whom the sample was taken.

8. The method of claim 7, wherein the physiological state is a disease state.

9. The method of claim 8, wherein the disease state is a cancerous state.

* * * * *